UNITED STATES PATENT OFFICE.

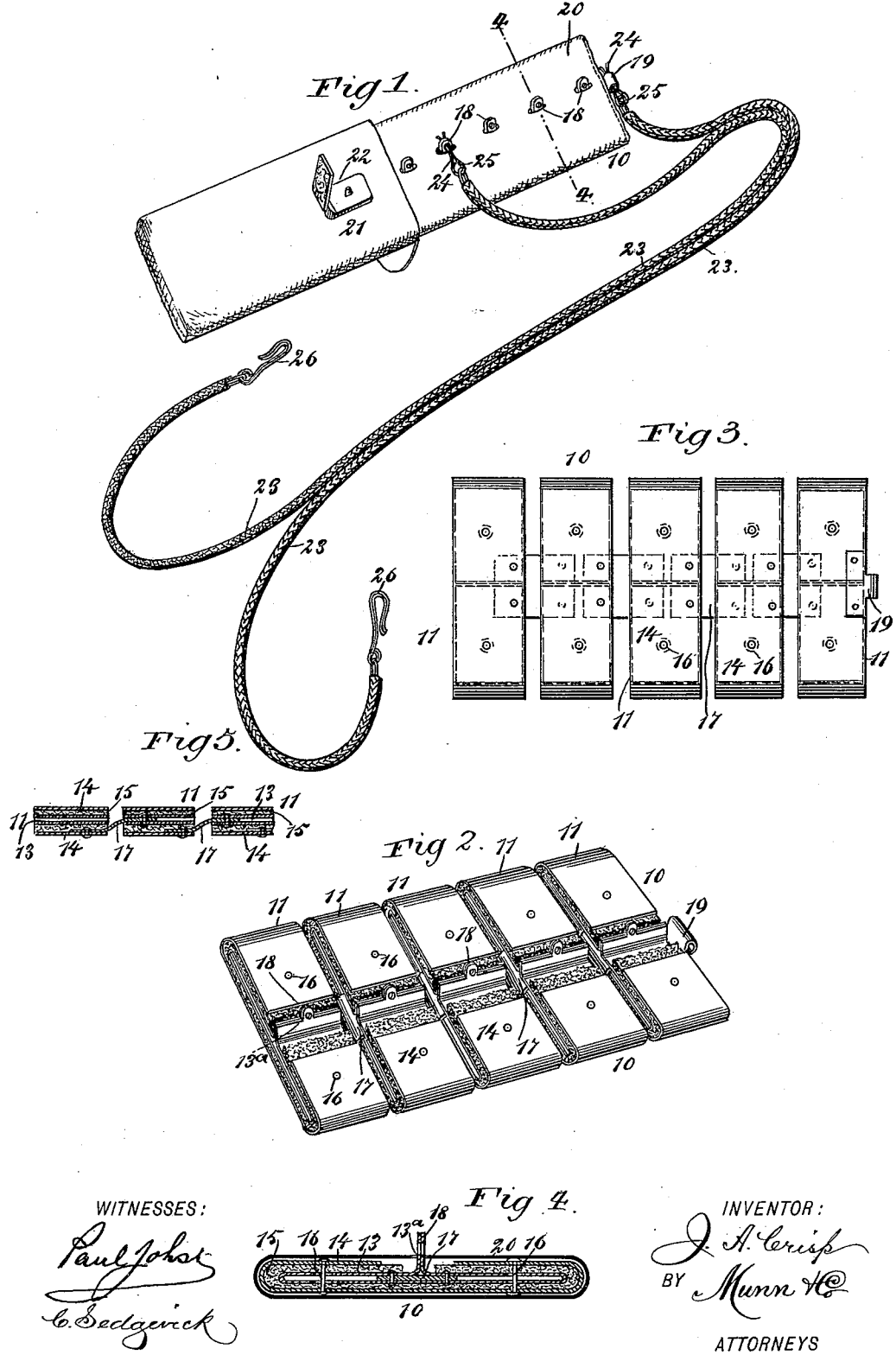

JOHN A. CRISP, OF JEFFERSON, OHIO.

THERAPEUTIC ELECTRIC BATTERY.

SPECIFICATION forming part of Letters Patent No. 463,945, dated November 24, 1891.

Application filed March 31, 1891. Serial No. 387,085. (No model.)

*To all whom it may concern:*

Be it known that I, JOHN A. CRISP, of Jefferson, in the county of Ashtabula and State of Ohio, have invented a new and Improved Electric Battery, of which the following is a full, clear, and exact description.

My invention relates to improvements in electric batteries; and the object of my invention is to produce a simple, efficient, and inexpensive battery, which may be conveniently carried in the pocket or upon the body and which may be quickly adjusted so as to give the desired amount of current.

To this end my invention consists of a battery constructed as hereinafter described and claimed.

Reference is to be had to the accompanying drawings, forming a part of this specification, in which similar figures of reference indicate corresponding parts in all the views.

Figure 1 is a perspective view of the battery as it appears when inclosed in its water-proof pocket and connected with conducting-wires, the pocket being partly withdrawn from the outer case. Fig. 2 is a top perspective view of the battery. Fig. 3 is an inverted plan of the same. Fig. 4 is a cross-section on the line 4 4 in Fig. 1, and Fig. 5 is a broken longitudinal section showing the connection between the cells of the battery.

The battery 10 consists of several cells 11, composed of zinc-copper elements, any desired number of cells being used, and each cell comprises an inner sheet of copper 13, which is doubled upon itself, as best shown in Fig. 4, an outer sheet of zinc 14, which is doubled around the copper, an interposed layer of felt or other absorbent 15, which is a non-conductor and which separates the zinc and copper, and rivets 16, which extend through the cells, the rivets serving to clamp the parts together, and they extend through holes in the copper, as shown in Fig. 4, so that they will not contact with the copper, and the ends of the copper elements 13 meet near the center of each cell and are pressed together and arranged to extend outward from the cell, as shown at 13ª, and each of these laterally-extending portions is provided with a projecting perforated ear 18, with which contact is made by one of the conducting-wires, and at one end of the battery a zinc element is provided with a socket 19, which is also adapted to contact with the wires. The various cells are connected by copper strips 17, which strips connect the zinc of one cell to the copper of the next, and so on through the entire series of cells.

The battery is held in a water-proof pocket 20, which pocket has perforations at intervals, so that the ears 18 may project through it, and the pocket fits within an outer casing 21, which is preferably of leather, and which is provided with a common form of catch 22, so that the end of the casing may be doubled over the pocket and battery and secured in the catch.

The conducting-wires 23 are preferably bound together, and at one end are provided with spring-fingers 24, which are normally pressed apart by a coil-spring 25, and which are adapted to be inserted in the ears 18 and socket 19, so as to make connection with the battery, and at opposite ends the wires are provided with hooks 26, which may be connected with any desirable form of electrode.

The battery is intended especially for medical use, and the electrodes would usually be such as would be adapted to be applied to the body. When the battery is to be used, it is dipped in acid, preferably strong cider vinegar, and the felt between the elements of the cells will absorb enough of the exciting-fluid to run the battery for some little time. One of the terminals of the wires is connected with a zinc element of the battery, as described, and the terminal of the other wire may be connected with any one of the ears 18, and it will be seen that the current will be weaker or stronger, according as the ear 18, with which the terminal is connected, is nearer to or farther from the cell with which the other terminal is connected.

The battery described above may be carried in the pocket, and may be connected with any of the well-known forms of electric belts or body-electrodes, and the strength of the current may be quickly and easily changed to suit the wearer. This is a great advantage, as body-batteries are usually worn beneath the clothing, and in this case they are liable to injure the wearer, and the clothing has to be removed before they can be adjusted.

Having thus described my invention, I claim as new and desire to secure by Letters Patent—

1. An electric battery comprising a series of cells, each consisting of a copper plate doubled upon itself and having its ends brought together, apertured and extended outward to form an ear, with which one of the conductors is to be connected, an absorbent material surrounding the copper plate, and a zinc plate surrounding the absorbent material, the several cells being connected together by a copper plate and the zinc plate of one of the cells provided with a socket, with which the other conductor is to be connected, substantially as herein shown and described.

2. In an electric battery, the combination, with a series of connected cells formed of copper and zinc plates and an interposed absorbent material, the copper plates being provided with projecting apertured ears, with one of which one of the conductors is to be connected, and the zinc plate of one of the cells with a socket, with which the other conductor is to be connected, of a water-proof pocket to receive the battery, the said pocket being provided with a series of apertures through which the apertured ears project, substantially as and for the purpose set forth.

3. An electric battery consisting of a series of cells formed of copper and zinc plates and an interposed absorbent material, the copper plates being provided with projecting apertured ears and the zinc plate of one of the cells with a socket, a water-proof pocket to receive the battery, the said pocket being provided with a series of apertures through which the said ears project, and conducting-wires provided with fingers for engaging the socket and one of the said ears, substantially as herein shown and described.

JOHN A. CRISP.

Witnesses:
   W. D. HOWELL, Jr.,
   W. A. DODGE.